(12) United States Patent
Sadleir

(10) Patent No.: US 9,404,271 B1
(45) Date of Patent: Aug. 2, 2016

(54) SYSTEM AND METHOD FOR CREATING CONCRETE DESIGNS

(71) Applicant: Gerald Sadleir, Santee, CA (US)

(72) Inventor: Gerald Sadleir, Santee, CA (US)

(*) Notice: Subject to any disclaimer, the term of this patent is extended or adjusted under 35 U.S.C. 154(b) by 29 days.

(21) Appl. No.: 14/494,376

(22) Filed: Sep. 23, 2014

(51) Int. Cl.
| | |
|---|---|
| *E04B 1/00* | (2006.01) |
| *E04F 13/16* | (2006.01) |
| *E04F 13/08* | (2006.01) |
| *E04F 13/14* | (2006.01) |
| *E04F 13/21* | (2006.01) |
| *E04F 15/02* | (2006.01) |
| *E04F 15/022* | (2006.01) |
| *B28B 1/14* | (2006.01) |
| *B28B 7/00* | (2006.01) |

(52) U.S. Cl.
CPC ............... *E04F 13/165* (2013.01); *B28B 1/14* (2013.01); *B28B 7/007* (2013.01); *E04F 13/0885* (2013.01); *E04F 13/141* (2013.01); *E04F 13/147* (2013.01); *E04F 13/21* (2013.01); *E04F 15/022* (2013.01); *E04F 15/02183* (2013.01); *B28B 7/0038* (2013.01)

(58) Field of Classification Search
CPC ........ B28B 7/007; B28B 7/348; B28B 13/02; B28B 5/04; B28B 7/0038; B28B 7/346; B28B 1/14; E04F 13/165
USPC ............... 428/15; 52/742.13, 742.14, 747.11, 52/747.12
See application file for complete search history.

(56) References Cited

U.S. PATENT DOCUMENTS

| | | | | |
|---|---|---|---|---|
| 3,925,679 | A * | 12/1975 | Berman et al. ................ | 290/1 R |
| 6,205,742 | B1 * | 3/2001 | Hahn ........................... | 52/748.1 |
| 8,316,779 | B2 * | 11/2012 | Gordon ........................ | 108/51.3 |
| 2003/0024935 | A1 * | 2/2003 | Kind ............................. | 220/571 |
| 2003/0194502 | A1 * | 10/2003 | Sadleir ......................... | 427/427 |
| 2004/0107879 | A1 * | 6/2004 | Schutz ....................... | 108/51.11 |
| 2006/0019041 | A1 * | 1/2006 | Good-Kruger et al. ......... | 428/15 |
| 2010/0005733 | A1 * | 1/2010 | Anderson ........................ | 52/98 |
| 2011/0048990 | A1 * | 3/2011 | Goda ........................... | 206/386 |

* cited by examiner

*Primary Examiner* — Phi A
*Assistant Examiner* — Omar Hijaz

(57) ABSTRACT

A system and method for creating custom concrete designs includes one or more textured concrete forms used to create concrete "tiles" with the desired surface appearance, generally mimicking the surface appearance of natural stone or other desired pattern. The method involves creating a plurality of cement tiles in the desired shape, pattern, and texture. These cement tiles are most preferably in the range of 1/4"-5/16" thick using a proprietary cementious mixture poured into molds. The concrete used to form the tiles may be colored before it is poured into the form or it may be colored after the concrete has set. After the desired number of concrete tiles have been formed, they may be positioned and fixed in place so as to cover the desired area and create the desired effect for the selected application.

6 Claims, 3 Drawing Sheets

SYSTEM AND METHOD FOR CREATING CONCRETE DESIGNS

BACKGROUND OF THE INVENTION

1. Technical Field

The present invention relates generally to the field of construction and more specifically relates to a system and method for creating custom designs in concrete.

2. Background Art

Concrete is a well-known building material and the use of concrete to construct buildings, roads, walkways, etc. is commonplace around the world. Concrete can be used for creating design elements as well as structural components. For example, decorative concrete elements are generally considered to be durable and flexible in style and size, allowing for significant creativity in the construction design and fabrication process. In many cases, while natural stone may be preferred, the cost of using natural stone may be prohibitive.

To address the limitations associated with creating decorative elements, "stamped concrete" may be used. Stamped concrete is concrete that is patterned, textured or embossed to resemble brick, slate, flagstone, stone, tile, wood, as well as various other patterns and textures. Stamped concrete is commonly used for patios, sidewalks, driveways, pool decks, and interior flooring. The ability of stamped concrete to resemble other building materials makes stamped concrete a less expensive alternative to using authentic materials such as stone, slate or brick.

When creating stamped concrete, a pattern is formed on the surface of a concrete slab by imprinting the concrete shortly after it has been poured with a "concrete stamp." Most modern concrete stamps are manufactured from polyurethane, but older "cookie cutter" style stamps were made of various metals. The old style stamps typically lacked the capabilities of forming natural stone texture and were more commonly used to create substantially angular geometric shapes.

While concrete stamping is a very popular process for creating decorative concrete features, its use is not without certain limitations. For example, to achieve a stamped concrete finish requires professional, skilled concrete workers with years of experience. The conventional method requires pouring a concrete slab approximately 4"-6" thick (or ¼" thick if pouring a concrete overlay over an existing slab), professionally troweling the surface, and then stamping it with the desired pattern or texture using the proper concrete tools and conventional rubber stamps. Skill, experience, and timing are critical to achieve a consistent texture and pattern. Using the previously known methods, it is difficult for even a trained professional to achieve a consistent texture over the entire surface of the slab.

On many jobs, it is common to find areas with relatively smooth spots where the concrete became too hard before it could be properly stamped or textured. Additionally, it can be quite expensive to purchase multiple concrete stamps in order to create the desired number of designs. Accordingly, without improvements in the process and techniques in texturing concrete, the ability of the average homeowner or contractor to create decorative concrete surfaces will continue to be suboptimal.

BRIEF SUMMARY OF THE INVENTION

The present invention comprises a system and method for creating custom concrete designs from a plurality of concrete "tiles." Each tile is formed from a textured mold with the desired surface appearance, generally mimicking the surface appearance of natural stone or other desired pattern. The method involves creating a plurality of cement tiles in the desired shape, pattern, and texture. These cement tiles are most preferably in the range of ¼"-5/16" thick using a proprietary cementious mixture poured into molds. The admixture used to form the tiles may be colored before it is poured into the form or it may be colored after the concrete has set. After the desired number of concrete tiles have been formed, they may be positioned and fixed in place so as to cover the desired area and create the desired effect for the selected application.

BRIEF DESCRIPTION OF THE DRAWINGS

The preferred embodiments of the present invention will hereinafter be described in conjunction with the appended drawings, wherein like designations denote like elements, and.

DETAILED DESCRIPTION

The present invention comprises a series of tiles that function as a stamped concrete overlay system that allows experience or inexperienced individuals to easily create a professional stamped concrete finish over existing concrete surfaces. Practically any relatively flat surface can be covered with a decorative design by applying the system and method disclosed herein.

A system and method for creating custom concrete designs includes one or more textured concrete forms used to create concrete "tiles" with the desired surface appearance, generally mimicking the surface appearance of natural stone or other desired pattern. The method involves creating a plurality of cement tiles in the desired shape, pattern, and texture. These cement tiles are most preferably in the range of ¼"-5/16" thick using a proprietary cementious mixture poured into molds. The concrete used to form the tiles may be colored before it is poured into the form or it may be colored after the concrete has set. After the desired number of concrete tiles have been formed, they may be positioned and fixed in place so as to cover the desired area and create the desired effect for the selected application.

By using the system and method described herein, a homeowner or contractor with no prior concrete experience will be able to achieve a substantially uniform, consistent pattern and texture on every concrete surface. The method involves creating a plurality of cement tiles in the desired shape, pattern, and texture. These cement tiles are most preferably in the range of ¼"-5/16" thick using a proprietary cementious mixture and custom made rubber molds. The molds are most preferably manufactured from a rubber material.

Figure 1:
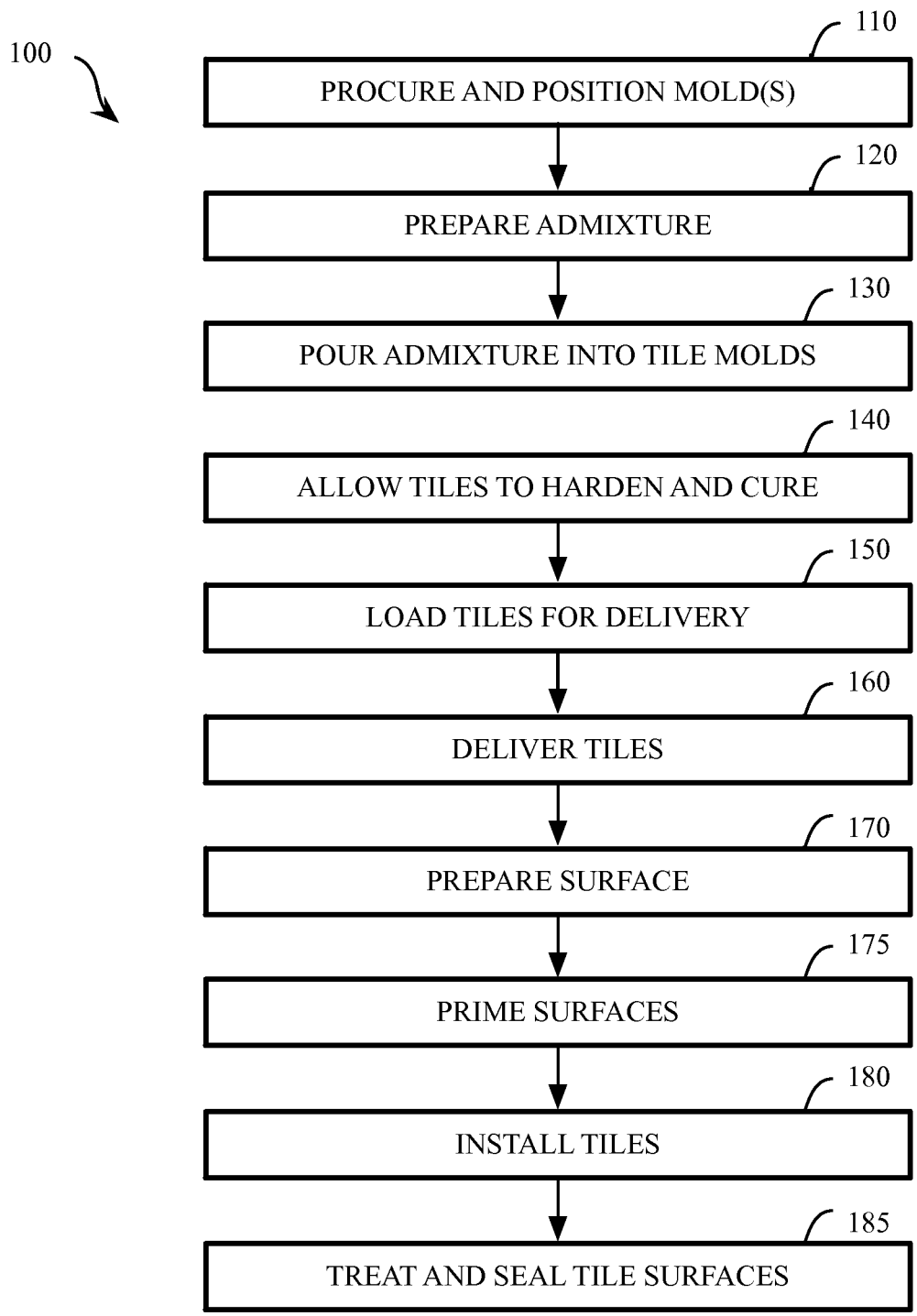
FIG. 1 is a flow chart for a method of creating a textured concrete surface using one or more textured concrete tiles in accordance with a preferred embodiment of the present invention.

Referring now to FIG. 1, a flow chart 100 for a method of creating a textured concrete surface using one or more textured concrete tiles in accordance with a preferred embodiment of the present invention is depicted. As shown in FIG. 1, one or more molds are procured and positioned for use in the creation of a textured concrete surface (step 110). The selected mold may have any type of desired surface pattern, with the surface pattern being selected for the specific application. Multiple molds may be selected with the finished tiles being "mixed and matched" to create the desired effect.

As previously mentioned, the surface pattern of the mold may be designed to mimic the appearance of practically any type of natural stone as well as other types of surfaces. It is important to note that the most preferred embodiments of the present invention comprise a mold that is manufactured from a durable rubber material. Once the desired mold(s) have been procured, the molds can be staged for pouring. The rubber tile molds may be placed on any suitable surface such as a workbench or even a loose piece of 3'×3'×⅝" particleboard. The most important aspect is to ensure that the molds are positioned so as to be stable and relatively flat. This will help to ensure the resultant tiles are relatively flat on the backside (e.g., the non-textured side). This will enable the finished concrete tiles to have a smooth finished surface that will allow the concrete tiles to be placed on a concrete slab or other surface with proper installation techniques.

With the molds properly positioned in a stable location and on a stable surface, the concrete admixture is prepared (step 120). Any technique known to those skilled in the art may be used 16 gallon, heavy duty, plastic mixing container using a high-powered drill and mixing paddle. Put the mixing container on a dolly with wheels before or after mixing to make it easy to move to each mold to be poured.

Next, the admixture can be poured into the rubber molds using any suitable technique, including using a large bucket with approximately 1.5 gallons of admixture being poured into each mold (step 130). In some cases, the admixture will contain harsh chemicals so standard safety procedures should be followed (e.g., wearing rubber gloves and eye protections, etc.). Using hands or a small trowel, the admixture should be spread to the edges of the mold. The exposed surface can be worked with a trowel until smooth and level with the top edge all the way around the edges of the mold and any excess admixture has been removed.

When the admixture has been poured into the mold, the molds can be gently "shaken" to settle the admixture into the mold, including any nooks and crannies and is substantially level. If necessary, the top surface (which will be the bottom of the tile once the tile if flipped over for installation) can be smoothed by a trowel or 2×4 to "screed" of any excess admixture. The concrete tile admixture is then allowed to dry and harden (step 140) until the concrete is firm enough to flip the mold over and remove the tile from the mold. It is important to note that drying time can be anywhere from three hours to overnight, depending on the temperature and amount of accelerator used in the admixture. After removing the tiles from the molds, stack the tiles on top of each other in a container on the floor or on a table or similar surface to allow the tiles to cure for later use.

When the tiles are selected for installation at a specific location, an empty box can be placed on the bed of a truck, trailer, or wooden pallet, depending on the total weight of the tiles to be transported. For a standard application, each concrete tile is approximately 5/16" thick, between 28"-34" wide, and weighs approximately 15-17 pounds. The most preferred embodiments of the present invention further comprise a concrete tile box that will typically hold up to 140 concrete tiles or 2,400 pounds, which, for most applications, will be enough tiles to cover approximately 700 sq. ft.-840 sq. ft. In the most preferred embodiments of the present invention utilize a box that is formed from a base portion with one or more removable sides that have been manufactured with latches, allowing one or more of the sides of the box to be selectively removed, thereby leaving an opening to access the interior of the box. Once the tiles have been placed into the box, any removed side(s) can be reinstalled by attaching them to the base, thereby completing the box and securing the decorative tiles for delivery.

To simply the process, and reduce the amount of work required to load the tiles, the empty tile box can be loaded onto a trailer or bed of a truck using a forklift or by two or more people by hand. Then the tiles can be loaded into the empty tile box. If a forklift is available, the tiles can be loaded in the box immediately after removing them from the molds and before loading the box on the truck. This will involve the least amount of handling for the decorative tiles. If no forklift is available, the tiles can be stacked in the empty box after it is loaded on the truck or trailer by hand. Once the box is filled to capacity or with the amount of tiles needed for the job, secure the front door back in place using the quick connect latches on the sides of the box and the tiles are ready for delivery (step 150). The tiles are then transported to the job site (step 160).

The installation surface is then cleaned and prepared for installation (step 170) by scrubbing the surface with detergent and pressure washing, and any cracks and joints are filled with sand and/or an appropriate primer. The back of the tile is also treated with a primer (step 175). With the primer in place and while the surface of the tile and the installation surface is still wet or tacky, the tile can be placed on the installation surface and pressed firmly into place. This process is continued until the entire surface is covered with tiles. With the tiles in place, and where needed (e.g., next to walls and edges) the installer can measure and cut the tiles using a tile cutter to ensure that the tiles fit the surface properly. Optionally, for some applications, it may be desirable to use a conventional concrete stamping method to stamp the edges of steps and to create borders next to the concrete tiles formed by using the concrete tile forming method of the present invention.

Additionally, as part of the installation process, any open gaps or seams between the tiles can be filled with grout and then allowed to dry. After the cement and grout have hardened and dried, the entire surface can be treated with any desired effects (e.g., colors, antiquing, etc.) and then sealed. After installation and sealing, the tiles should be allowed to cure t least overnight or longer before permitting traffic on the installed tiles.

Figure 2:
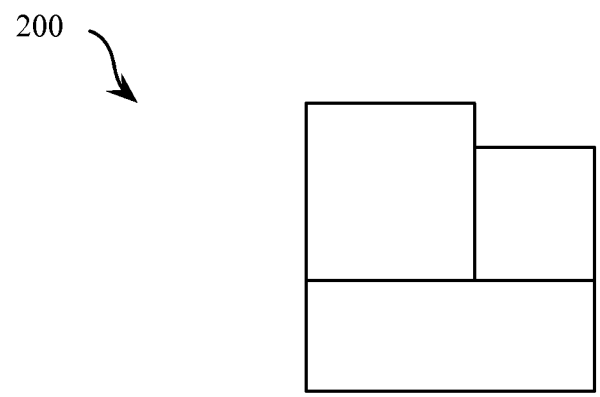
FIG. 2 is a plan view of a textured concrete tile suitable for use in creating a textured concrete surface in accordance with a preferred embodiment of the present invention.

Referring now to FIG. 2, a textured concrete tile 200 suitable for use in creating a textured concrete surface in accordance with a preferred embodiment of the present invention is depicted. Concrete tile 200 was formed using method 100 of FIG. 1. As shown in FIG. 2, concrete tile 200 has a substantially rectangular shape and includes several lines that serve to break up the pattern on the surface of concrete tile 200. As previously mentioned, the surface of concrete tile 200 may have various 3-dimensional surficial patterns formed in the surface of concrete tile 200, depending on the mold selected for use. The surface of concrete tile 200 may be formed so as to represent any type of natural stone or other material.

Figure 3:
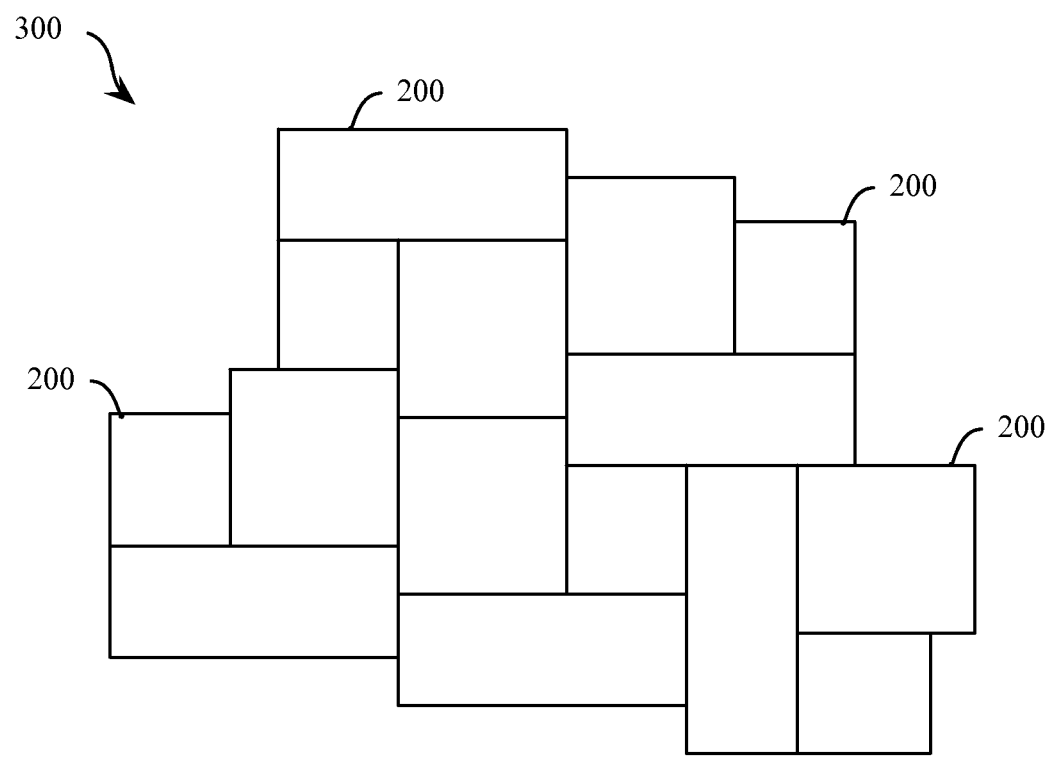
FIG. 3 is a plan view of a group of textured concrete tiles arranged to create a textured concrete surface in accordance with a preferred embodiment of the present invention.

Referring now to FIG. 3, a plan view of a plurality of textured concrete tiles 200 have been arranged to create a textured concrete surface 300 in accordance with a preferred embodiment of the present invention a plurality of concrete tiles 200 have been arranged, positioned, and cemented in place so as to form textured concrete surface 300.

Figure 4:
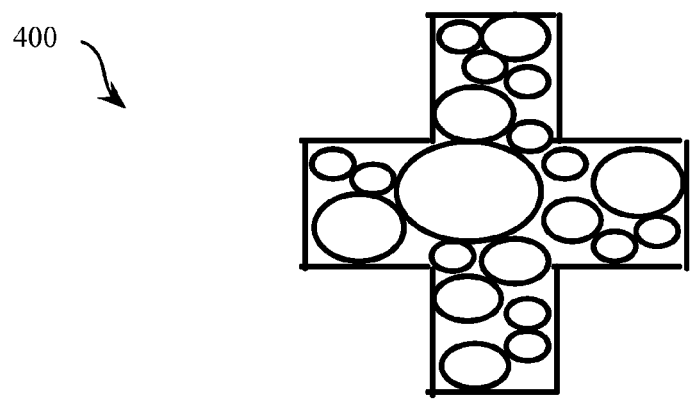
FIG. 4 is a plan view of a textured concrete tile suitable for use in creating a textured concrete surface in accordance with a preferred embodiment of the present invention.

Referring now to FIG. 4, a textured concrete tile 400 suitable for use in creating a textured concrete surface in accordance with a preferred embodiment of the present invention is depicted. Concrete tile 400 was formed using method 100 of FIG. 1. As shown in FIG. 4, concrete tile 400 has an irregular shape and includes several different sizes and styles of patterns formed on the surface of concrete tile 400 that serve to break up the pattern on the surface of concrete tile 400. As previously mentioned, the surface of concrete tile 400 may have various 3-dimensional surficial patterns formed in the surface of concrete tile 400, depending on the mold selected for use. The surface of concrete tile 400 may be formed so as to represent any type of natural stone or other material.

Figure 5:
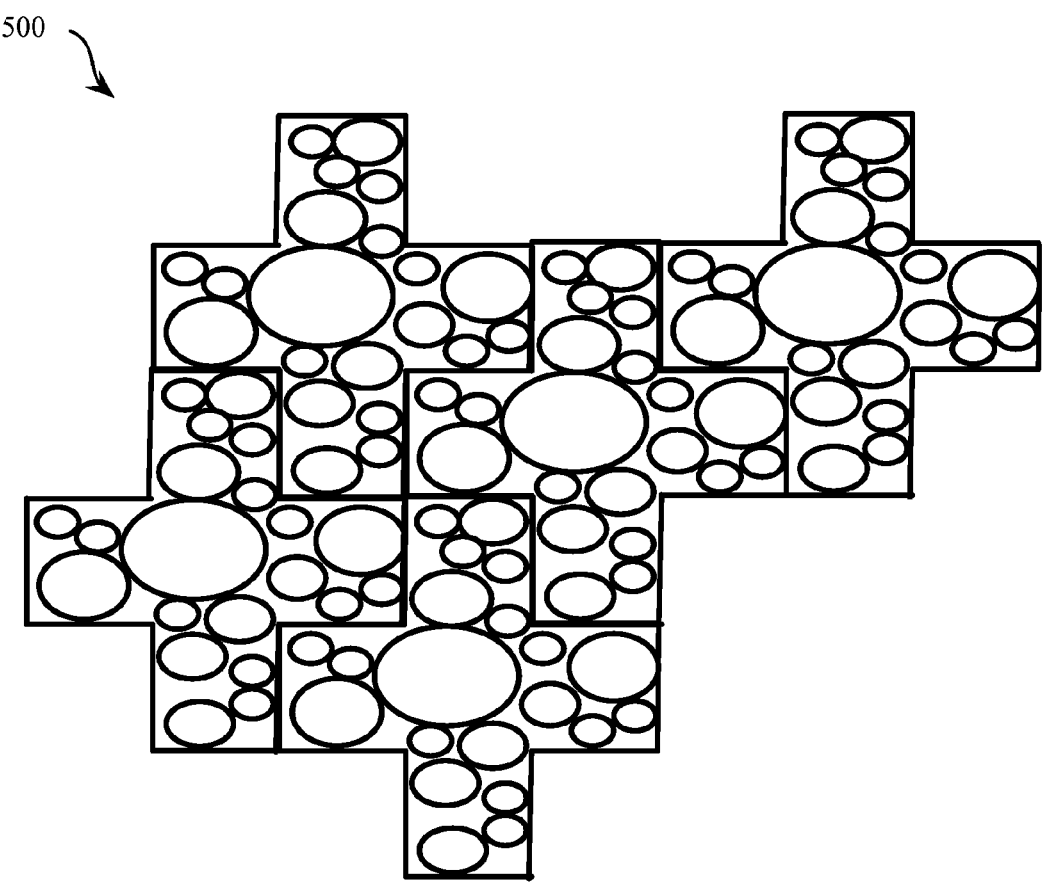
FIG. 5 is a plan view of a group of textured concrete tiles arranged to create a textured concrete surface in accordance with a preferred embodiment of the present invention.

Referring now to FIG. 5, a plan view of a plurality of textured concrete tiles 400 have been arranged to create a textured concrete surface 500 in accordance with a preferred embodiment of the present invention a plurality of concrete tiles 400 have been arranged, positioned, and cemented in place so as to form textured concrete surface 500.

In summary, there are a series of components used in the current system and method. The names for each product in the system are: i) precast molds, typically formed from urethane rubber with a variety of different shapes and textures for casting cementitious tiles; ii) an admixture used to create the cementitious substance that is poured into the rubber molds to create the actual concrete tile; iii) and the tiles that are created by the system, where one or more tiles are placed on a surface.

For covering an area of approximately 40 square feet, the admixture would most preferably comprise 13 lbs. of rapid set cement (e.g., fast setting hydraulic cement); 8 oz. of a powder water reducer (e.g., Melment F10); pigment (e.g., 1 oz. #677 Davis colors pigment) to add a desired color to the finished tile; 0.75 lbs. of powder polymer, most preferably made with vinyl ethylene acetate; 1.5 lbs. of AR (alkali resistant) glass fiber (13h-350y) with a diameter in the range of approximately 13 mm. These components are mixed with approximately 47 lbs. of Portland cement (type I/II or II/IV) with approximately 50 lbs. of #30 silica sand and approximately 2.75 gallons of water.

The molds used in the method described above may be manufactured using many different methods. For purposes of illustration, the following method is described. A pattern for a form to create one or more molds may be started by cutting the desired shape from a relatively lightweight and stable substance such as Melamine. Those skilled in the art will recognize that the many other substances (e.g., plywood, MDF, etc.) may be used.

Then the desired grout lines can be drawn onto the pattern to identify or define the shape of each stone or tile within the pattern. The examples in FIG. 2 and FIG. 4 are illustrations of this and particularly FIG. 4 where the molds for the tiles are formed with a stone-like texture being formed in the tile. Once the shapes for each stone have been identified, the next step is to find the desired textures for each stone by finding stone with the desired textures. With the desired stone textures identified, molten clay is then poured over the textures of natural stones and, after cooling, the clay is cut to match the shapes of the stones selected for the tile forms. The cut and textured clay pieces are placed on the melamine board and more clay is used to simulate grout lines in between each stone shape. Next, melamine side panels are formed around edge of the pattern to form an enclosed box around the clay forms.

With the form being substantially complete, the surface of the clay is brushed with a release agent and a two-part urethane rubber is poured over the clay to a depth of approximately one inch. The rubber used is most preferably a rubber substance that yields a relatively flexible result when cured, meaning that the finished rubber mold will be rather easy to bend in half. Next, the finished rubber mold is placed into a stable box with approximately a 1" border going around the edges to be used as a master mold. The master mold is used to create additional molds or tiles.

Once the molds have been completed, the tiles can be formed by pouring the liquid cementitious material into the mold. The top of the tile can be smoothed with a trowel or other tool to ensure a smooth surface for placing the finished tiles on a surface. After the material for the tile has set up, and the tile is removed from the mold, the tiles can be placed in position. In general, a moisture barrier epoxy primer is sprayed or rolled over the concrete or surface to be covered with tiles. Then, the back of each tile will be prepared with an epoxy primer using a roller or sprayer. After the primer has been applied to the back of the tile, a cement adhesive is applied to the back of each tile over the epoxy using a ⅜" notched trowel or some other readily recognized method.

Immediately after the applying the adhesive to the back of the tile the tile can be placed over the wet or tacky primer that was applied over the surface where the tiles are to be placed. With the tile in place, it is also must on the tile to press it into the adhesive and to bond it to the surface. That process is repeated one tile at a time with the tiles being placed on the surface with the pieces being fit together like a puzzle until the whole surface is covered with tiles. It is often desirable to walk over the tiles or place weights on the tiles until the adhesive has had time to cure. The seams between the tiles are grouted as well, using the same admixture as used to form the tiles.

Once the tiles have been placed and the grout has dried, the surface of the tiles can coated with various materials to add color, texture, acid stains, antiquing, etc. and the entire surface can be sealed as well with one or more coats to finalize the installation.

From the foregoing description, it should be appreciated that the system and method for creating decorative concrete surfaces are provided and present significant benefits that would be apparent to one skilled in the art. Furthermore, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient framework for implementing a preferred exemplary embodiment of the invention. It being understood that various changes may be made in the function and arrangement of elements described in the exemplary preferred embodiment without departing from the spirit and scope of the invention as set forth in the appended claims.

The invention claimed is:

1. A method of creating a decorative design for a surface comprising the steps of:
   a) preparing a cementitious admixture;
   b) pouring the cementitious admixture into at least one rubber mold, the at least one rubber mold comprising a textured surface, wherein the at least one rubber mold is manufactured by a process comprising the steps of:
      creating a tile pattern from a substantially flat lightweight material;
      drawing a series of grout lines on the pattern, thereby defining a plurality of desired shapes;

locating at least one object with a desired texture:
pouring molten clay over the at least one object;
allowing the molten clay to harden, creating at least one hardened clay object;
cutting the at least one hardened clay object to match the plurality of desired shapes;
affixing the at least one hardened clay object to a surface of the tile pattern, thereby creating a patterned surface;
affixing sides to the tile pattern, thereby forming a box;
brushing the patterned surface with a release agent;
pouring a liquid rubber over the clay;
allowing the liquid rubber to cure; and
removing the rubber mold from the box;

c) allowing the admixture to harden, thereby forming a decorative tile;

d) removing the decorative tile from the at least one mold;

e) repeating steps b-d to create a plurality of decorative tiles:

f) preparing the surface; and g) affixing the plurality of decorative tiles to the surface, thereby creating a decorative design.

2. The method of claim 1 wherein the textured surface resembles at least one of a brick surface, a slate surface, a flagstone surface, a stone surface, a tile surface, and a wood surface.

3. The method of claim 1 further comprising the steps of:
loading the plurality of decorative tiles into a box; and
transporting the box containing the decorative tiles to an installation location.

4. The method of claim 1 further comprising a pigment added to the admixture prior to the step of pouring the cementitious admixture into the at least one rubber mold.

5. The method of claim 1 wherein the cementitious admixture comprises:
a portion of fast setting hydraulic cement;
a powdered water reducer;
a powdered polymer made with vinyl ethylene acetate;
a plurality of alkali resistant glass fibers;
a portion of portland cement;
a portion of silica sand; and
a portion of water.

6. The method of claim 1 wherein the cementitious admixture comprises:
13 pounds of fast setting hydraulic cement;
8 ounces of powdered water reducer;
0.75 pounds of powdered polymer made with vinyl ethylene acetate;
1.5 pounds of alkali resistant glass fibers, each of said alkali resistant glass fibers comprising a diameter of approximately 13 mm;
47 pounds of portland cement;
50 pounds of #30 silica sand; and
2.75 gallons of water.

* * * * *